US011295693B2

(12) United States Patent
Liu et al.

(10) Patent No.: US 11,295,693 B2
(45) Date of Patent: Apr. 5, 2022

(54) GATE DRIVING CIRCUIT, CURRENT ADJUSTING METHOD THEREOF AND DISPLAY DEVICE

(71) Applicants: HEFEI XINSHENG OPTOELECTRONICS TECHNOLOGY CO., LTD., Anhui (CN); BOE TECHNOLOGY GROUP CO., LTD., Beijing (CN)

(72) Inventors: Xingyi Liu, Beijing (CN); Yongxian Xie, Beijing (CN); Chengying Cao, Beijing (CN); Jideng Zhou, Beijing (CN)

(73) Assignees: Hefei Xinsheng Optoelectronics Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 50 days.

(21) Appl. No.: 16/760,531

(22) PCT Filed: May 9, 2019

(86) PCT No.: PCT/CN2019/086269
§ 371 (c)(1),
(2) Date: Apr. 30, 2020

(87) PCT Pub. No.: WO2020/223970
PCT Pub. Date: Nov. 12, 2020

(65) Prior Publication Data
US 2021/0233486 A1 Jul. 29, 2021

(51) Int. Cl.
*G06F 3/00* (2006.01)
*G09G 3/36* (2006.01)

(52) U.S. Cl.
CPC ..... *G09G 3/3688* (2013.01); *G09G 2330/025* (2013.01)

(58) Field of Classification Search
None
See application file for complete search history.

(56) References Cited

U.S. PATENT DOCUMENTS 5,986,624 A 11/1999 Ando et al.
2005/0134315 A1* 6/2005 Nakahara ......... H03K 17/04123 326/88
2007/0063955 A1* 3/2007 Chen .................... G09G 3/3677 345/98

(Continued)

FOREIGN PATENT DOCUMENTS

CN 102629454 A 8/2012
CN 102708829 A 10/2012

(Continued)

*Primary Examiner* — Michael A Faragalla
(74) *Attorney, Agent, or Firm* — The Webb Law Firm

(57) ABSTRACT

The present disclosure provides a gate driving circuit, a current adjusting method thereof, and a display device. The gate driving circuit includes at least one gate driving sub-circuit. Each gate driving sub-circuit includes an output circuit and a current limiting circuit. The output circuit is configured to output a gate driving signal. The current limiting circuit is electrically connected to the output circuit. The current limiting circuit is configured to limit a current magnitude of the gate driving signal.

13 Claims, 6 Drawing Sheets

(56) References Cited

U.S. PATENT DOCUMENTS

| | | | | |
|---|---|---|---|---|
| 2009/0278590 | A1* | 11/2009 | Chang | G09G 3/3696 327/434 |
| 2012/0182661 | A1* | 7/2012 | Luo | H02H 3/087 361/93.7 |
| 2019/0051240 | A1 | 2/2019 | Nakatani et al. | |

FOREIGN PATENT DOCUMENTS

| | | | |
|---|---|---|---|
| CN | 105761694 | A | 7/2016 |
| CN | 107705742 | A | 2/2018 |
| CN | 108447434 | A | 8/2018 |
| CN | 109523965 | A | 3/2019 |
| JP | H08273560 | A | 10/1996 |

* cited by examiner

GATE DRIVING CIRCUIT, CURRENT ADJUSTING METHOD THEREOF AND DISPLAY DEVICE

CROSS-REFERENCE TO RELATED APPLICATION

This application is the United States national phase of PCT/CN2019/086269 filed May 9, 2019, the disclosure of which is hereby incorporated by reference in its entirety.

TECHNICAL FIELD

The present disclosure relates to a gate driving circuit, a current adjusting method thereof, and a display device.

BACKGROUND

The gate driving circuit (which also be referred to as GOA (Gate Driver On Array)) may implement such a driving manner as to progressively scan the display panel. The gate driving circuit technology is applied to various displays. At present, with the development of the display technology, the gate driving circuit technology has also been significantly developed.

SUMMARY

According to an aspect of embodiments of the present disclosure, a gate driving circuit is provided. The gate driving circuit comprises: at least one gate driving sub-circuit, each of which comprises: an output circuit configured to output a gate driving signal; and a current limiting circuit electrically connected to the output circuit, and configured to limit a current magnitude of the gate driving signal.

In some embodiments, a first terminal of the output circuit is electrically connected to a first signal input terminal, and a second terminal of the output circuit is electrically connected to a first signal output terminal; and the current limiting circuit is disposed between the first terminal of the output circuit and the first signal input terminal, or disposed between the second terminal of the output circuit and the first signal output terminal.

In some embodiments, the current limiting circuit comprises a first resistor.

In some embodiments, the first resistor comprises a sliding rheostat; and each of the at least one gate driving sub-circuit further comprises a control circuit configured to output an adjusting signal to the sliding rheostat according to the current magnitude of the gate driving signal to adjust a resistance value of the sliding rheostat.

In some embodiments, the control circuit is configured to output an adjusting signal for increasing the resistance value to the sliding rheostat in a case where the current magnitude of the gate driving signal is greater than a threshold.

In some embodiments, a current input terminal of the control circuit is electrically connected to the second terminal of the output circuit, a signal adjusting terminal of the control circuit is electrically connected to a signal receiving terminal of the sliding rheostat, and a current output terminal of the control circuit is electrically connected to the first signal output terminal.

In some embodiments, the control circuit comprises: a second resistor, a first terminal of the second resistor being electrically connected to the second terminal of the output circuit, and a second terminal of the second resistor being electrically connected to the first signal output terminal; a voltage detector connected in parallel with the second resistor and configured to obtain a voltage between the first terminal of the second resistor and the second terminal of the second resistor; and a signal processing sub-circuit, an input terminal of the signal processing sub-circuit being electrically connected to an output terminal of the voltage detector, an output terminal of the signal processing sub-circuit being electrically connected to a signal receiving terminal of the sliding rheostat, and the signal processing sub-circuit being configured to receive the voltage from the voltage detector, calculate the current magnitude of the gate driving signal according to the voltage and a resistance value of the second resistor, generate the adjusting signal according to the current magnitude of the gate driving signal, and transmit the adjusting signal to the sliding rheostat.

In some embodiments, the resistance value of the second resistor is less than a resistance value of the first resistor.

In some embodiments, the threshold ranges from 31 milliamperes (mA) to 36 mA.

In some embodiments, the at least one gate driving sub-circuit comprises a plurality of gate driving sub-circuits; the second terminal of the output circuit of one gate driving sub-circuit in the plurality of gate driving sub-circuits is electrically connected to a current input terminal of the control circuit, a current output terminal of the control circuit is electrically connected to a first signal output terminal corresponding to the output circuit of the one gate driving sub-circuit, the control circuit comprises a plurality of signal adjusting terminals electrically connected to a plurality of current limiting circuits of the plurality of gate driving sub-circuits in one-to-one correspondence.

In some embodiments, the output circuit comprises a first switching transistor, a gate of the first switching transistor being electrically connected to a pull-up node, a first electrode of the first switching transistor serving as the first terminal of the output circuit, and a second electrode of the first switching transistor serving as the second terminal of the output circuit.

In some embodiments, each of the at least one gate driving sub-circuit further comprises: an input circuit configured to pull up a potential of a pull-up node under a control of an input signal; the output circuit is configured to continue to pull up the potential of the pulled-up node under a control of a level signal, and output the gate driving signal; and each of the at least one gate driving sub-circuit further comprises a pull-down circuit configured to pull down the potential of the pull-up node that is pulled up, to make the output circuit stop outputting the gate driving signal.

In some embodiments, the output circuit further comprises: a second switching transistor, a gate of which is electrically connected to the pull-up node, a first electrode of which is electrically connected to the first electrode of the first switching transistor, and a second electrode of which is electrically connected to a second signal output terminal; and a capacitor, a first terminal of which is electrically connected to the gate of the first switching transistor, and a second terminal of which is electrically connected to the second electrode of the first switching transistor.

In some embodiments, the input circuit comprises a third switching transistor, a gate of which is electrically connected to a second signal input terminal, a first electrode of which is electrically connected to the gate of the third switching transistor, and a second electrode of which is electrically connected to the pull-up node.

In some embodiments, the pull-down circuit comprises: a fourth switching transistor, agate and a first electrode of which are electrically connected to a first voltage input terminal, and a second electrode of which is electrically connected to a first node; a fifth switching transistor, a first electrode of which is electrically connected to the first voltage input terminal, a second electrode of which is electrically connected to a third node, and a gate of which is electrically connected to the first node; a sixth switching transistor, agate and a first electrode of which are electrically connected to a second voltage input terminal, and a second electrode of which is electrically connected to a second node; a seventh switching transistor, a first electrode of which is electrically connected to the second voltage input terminal, a second electrode of which is electrically connected to a fourth node, and a gate of which is electrically connected to the second node; an eighth switching transistor, a gate of which is electrically connected to a third signal input terminal, a first electrode of which is electrically connected to the pull-up node, and a second electrode of which is electrically connected to a fourth signal input terminal; a ninth switching transistor, agate of which is electrically connected to a fifth signal input terminal, a first electrode of which is electrically connected to the pull-up node, and a second electrode of which is electrically connected to the fourth signal input terminal; a tenth switching transistor, a gate of which is electrically connected to the fourth node, a first electrode of which is electrically connected to the pull-up node, and a second electrode of which is electrically connected to the fourth signal input terminal; an eleventh switching transistor, agate of which is electrically connected to the third node, a first electrode of which is electrically connected to the pull-up node, and a second electrode of which is electrically connected to the fourth signal input terminal; a twelfth switching transistor, agate of which is electrically connected to the pull-up node, a first electrode of which is electrically connected to the first node, and a second electrode of which is electrically connected to the fourth signal input terminal; a thirteenth switching transistor, a gate of which is electrically connected to the pull-up node, a first electrode of which is electrically connected to the third node, and a second electrode of which is electrically connected to the fourth signal input terminal; a fourteenth switching transistor, a gate of which is electrically connected to the pull-up node, a first electrode of which is electrically connected to the second node, and a second electrode of which is electrically connected to the fourth signal input terminal; a fifteenth switching transistor, a gate of which is electrically connected to the pull-up node, a first electrode of which is electrically connected to the fourth node, and a second electrode of which is electrically connected to the fourth signal input terminal; a sixteenth switching transistor, a gate of which is electrically connected to the third node, a first electrode of which is electrically connected to the second electrode of the second switching transistor, and a second electrode of which is electrically connected to the fourth signal input terminal; a seventeenth switching transistor, a gate of which is electrically connected to the fourth node, a first electrode of which is electrically connected to the second electrode of the second switching transistor, and a second electrode of which is electrically connected to the fourth signal input terminal; an eighteenth switching transistor, a gate of which is electrically connected to the third node, a first electrode of which is electrically connected to the second electrode of the first switching transistor, and a second electrode of which is electrically connected to a sixth signal input terminal; a nineteenth switching transistor, a gate of which is electrically connected to the fourth node, a first electrode of which is electrically connected to the second electrode of the first switching transistor, and a second electrode of which is electrically connected to the sixth signal input terminal.

In some embodiments, the sliding rheostat comprise a digital sliding rheostat.

According to another aspect of embodiments of the present disclosure, a display device is provided. The display device comprises the gate driving circuit described above.

According to another aspect of embodiments of the present disclosure, a current adjusting method for a gate driving circuit is provided. The gate driving circuit comprises at least one gate driving sub-circuit, each of the at least one gate driving sub-circuit comprises an output circuit and a current limiting circuit electrically connected to the output circuit, and the current limiting circuit comprises a first resistor. The current adjusting method comprises: obtaining a current magnitude of a gate driving signal output by the output circuit; and adjusting a resistance value of the first resistor according to the current magnitude of the gate driving signal to adjust the current magnitude of the gate driving signal.

In some embodiments, the adjusting of the resistance value of the first resistor according to the current magnitude of the gate driving signal comprises: increasing the resistance value of the first resistor in a case where the current magnitude of the gate driving signal is greater than a threshold.

In some embodiments, the first resistor comprises a sliding rheostat; and the adjusting of the resistance value of the first resistor according to the current magnitude of the gate driving signal comprises: generating an adjusting signal according to the current magnitude of the gate driving signal; and transmitting the adjusting signal to the sliding rheostat to adjust a resistance value of the sliding rheostat.

Other features and advantages of the present disclosure will become apparent from the following detailed description of exemplary embodiments of the present disclosure with reference to the accompanying drawings.

BRIEF DESCRIPTION OF THE DRAWINGS

The accompanying drawings, which constitute part of this specification, illustrate exemplary embodiments of the present disclosure and, together with this specification, serve to explain the principles of the present disclosure.

The present disclosure may be more clearly understood from the following detailed description with reference to the accompanying drawings, in which.

Figure 1:
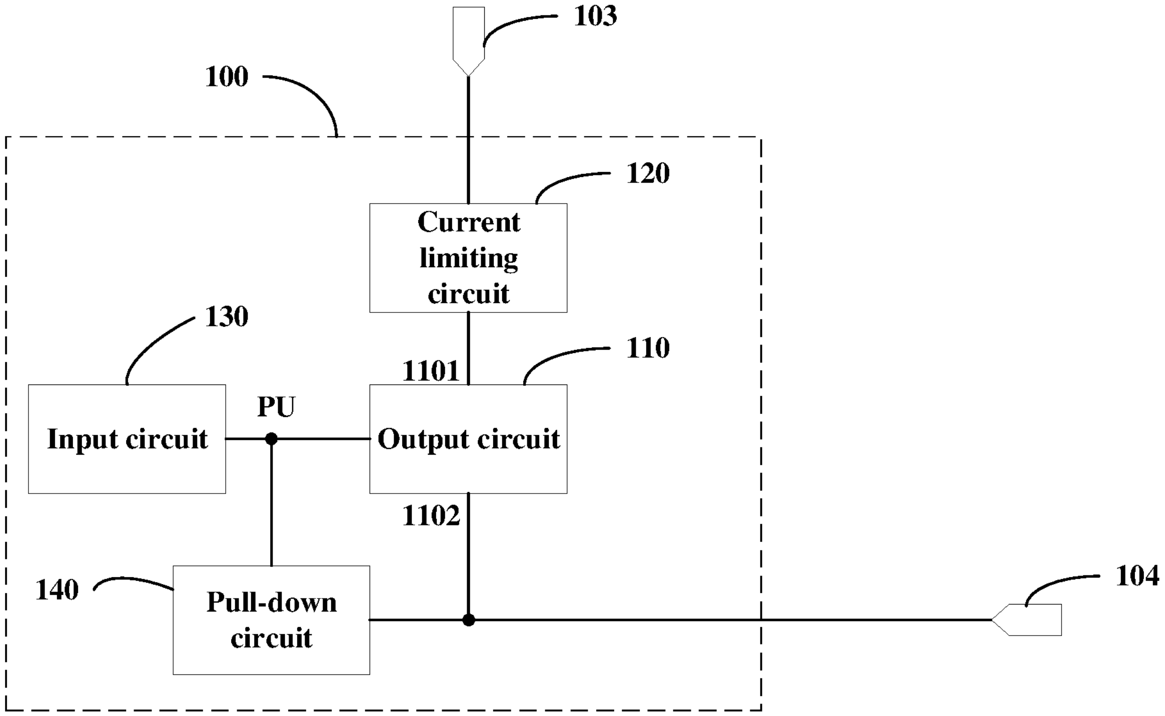
FIG. 1 is a schematic view showing a connection of a gate driving circuit according to an embodiment of the present disclosure.

It should be understood that the dimensions of the various parts shown in the accompanying drawings are not necessarily drawn according to the actual scale. In addition, the same or similar reference signs are used to denote the same or similar components.

DETAILED DESCRIPTION

Various exemplary embodiments of the present disclosure will now be described in detail in conjunction with the accompanying drawings. The description of the exemplary embodiments is merely illustrative and is in no way intended as a limitation to the present disclosure, its application or use. The present disclosure may be implemented in many different forms, which are not limited to the embodiments described herein. These embodiments are provided to make the present disclosure thorough and complete, and fully convey the scope of the present disclosure to those skilled in the art. It should be noticed that: relative arrangement of components and steps, material composition, numerical expressions, and numerical values set forth in these embodiments, unless specifically stated otherwise, should be explained as merely illustrative, and not as a limitation.

The use of the terms "first", "second" and similar words in the present disclosure do not denote any order, quantity or importance, but are merely used to distinguish between different parts. A word such as "comprise", "include", or the like means that the element before the word covers the element(s) listed after the word without excluding the possibility of also covering other elements. The terms "up", "down", "left", "right", or the like are used only to represent a relative positional relationship, and the relative positional relationship may be changed correspondingly if the absolute position of the described object changes.

In the present disclosure, when it is described that a particular device is located between the first device and the second device, there may be an intermediate device between the particular device and the first device or the second device, and alternatively, there may be no intermediate device. When it is described that a particular device is connected to other devices, the particular device may be directly connected to said other devices without an intermediate device, and alternatively, may not be directly connected to said other devices but with an intermediate device.

All the terms (comprising technical and scientific terms) used in the present disclosure have the same meanings as understood by those skilled in the art of the present disclosure unless otherwise defined. It should also be understood that terms as defined in general dictionaries, unless explicitly defined herein, should be interpreted as having meanings that are consistent with their meanings in the context of the relevant art, and not to be interpreted in an idealized or extremely formalized sense.

Techniques, methods, and apparatus known to those of ordinary skill in the relevant art may not be discussed in detail, but where appropriate, these techniques, methods, and apparatuses should be considered as part of this specification.

The gate driving circuit may output a gate driving signal to implement such a driving manner as to progressively scanning the display panel. Since the gate driving circuit is electrically connected to other circuits (e.g., pixel circuits) of the display panel, the gate driving signal may flow into other circuits in the form of current.

The inventors of the present disclosure have found that, in some gate driving circuits, a size of a transistor in an output circuit of the gate driving circuit is too large, which causes the current of the output gate driving signal to be too large. In this way, it is likely to cause a high temperature produced in an area where the gate driving circuit is located, so that the area is abnormal, which further results in that the output gate driving signal is abnormal, thereby affecting the display effect. The inventors of the present disclosure have also found through studies that when the above-described current is higher than 45 milliamperes (mA), the display panel might burn out within light emission for 10 minutes (which might result from burnout of via holes and the like within the display panel), which results in abnormal display; when the above-described current is lower than 36 mA, the display panel has no poor phenomenon, and still displays normally after continuously light emission for more than 1000 hours.

In view of this, embodiments of the present disclosure provide a gate driving circuit to limit a current of the gate driving signal and try to prevent abnormal display of the display panel that might result from an excessive current.

FIG. 1 is a schematic view showing a connection of a gate driving circuit according to an embodiment of the present disclosure.

As shown in FIG. 1, the gate driving circuit comprises at least one gate driving sub-circuit 100. Each gate driving sub-circuit 100 comprises an output circuit 110 and a current limiting circuit 120. The output circuit 110 is configured to output a gate driving signal. The current limiting unit 120 is electrically connected to the output circuit 110. The current limiting circuit 120 is configured to limit a current magnitude of the gate driving signal.

In some embodiments, as shown in FIG. 1, a first terminal 1101 of the output circuit 110 is electrically connected to a signal input terminal (which may be referred to as a first signal input terminal so as to distinguish it from other signal input terminals described later) 103, and a second terminal 1102 of the output circuit 110 is electrically connected to a signal output terminal (which may be referred to as a first signal output terminal so as to distinguish it from other signal output terminals described later) 104. For example, the signal input terminal 103 may be configured to input a level signal (e.g., a clock signal CLK) to the output circuit 110, and the signal output terminal 104 may be configured to output the gate driving signal to other circuits. As shown in FIG. 1, the current limiting circuit 120 may be disposed between the first terminal 1101 of the output circuit 110 and the signal input terminal 103. In other embodiments, the current limiting circuit 120 may also be disposed between the second terminal 1102 of the output circuit 110 and the signal output terminal 104 (not shown in FIG. 1).

In the above-described embodiments, the current limiting circuit is provided in the gate driving circuit, so that the current of the gate driving signal may be reduced, thereby preventing abnormal display of the display panel that might be caused by an excessive current as much as possible.

The inventors of the embodiments of the present disclosure have found that in the related art, the problem that the display panel is burned out by an excessive current may be prevented by changing a mask (e.g., an array mask) in the LCD (Liquid Crystal Display) production line (e.g., a 10.5th generation LCD production line). The mask is a mask for forming a transistor in the gate driving circuit and a transistor in the pixel circuit. The price of the mask is relatively high. Therefore, the above-described manner of changing the mask causes a relatively high production cost. However, in the above-described embodiment of the present disclosure, since the current limiting circuit is provided in the gate driving circuit, it is not necessary to change the mask. Therefore, the production cost for the embodiments of the present disclosure is thus relatively low.

In some embodiments, as shown in FIG. 1, each gate driving sub-circuit 100 may further comprise an input circuit 130 and a pull-down circuit 140. The input circuit 130 is configured to pull up a potential of a pull-up node PU under a control of an input signal. The output circuit 110 is configured to continue to pull up the potential of the pulled-up node PU under a control of the level signal, and output the gate driving signal. The pull-down circuit 140 is configured to pull down the potential of the pull-up node PU that is pulled up, to make the output circuit 110 stop outputting the gate driving signal.

Figure 2:
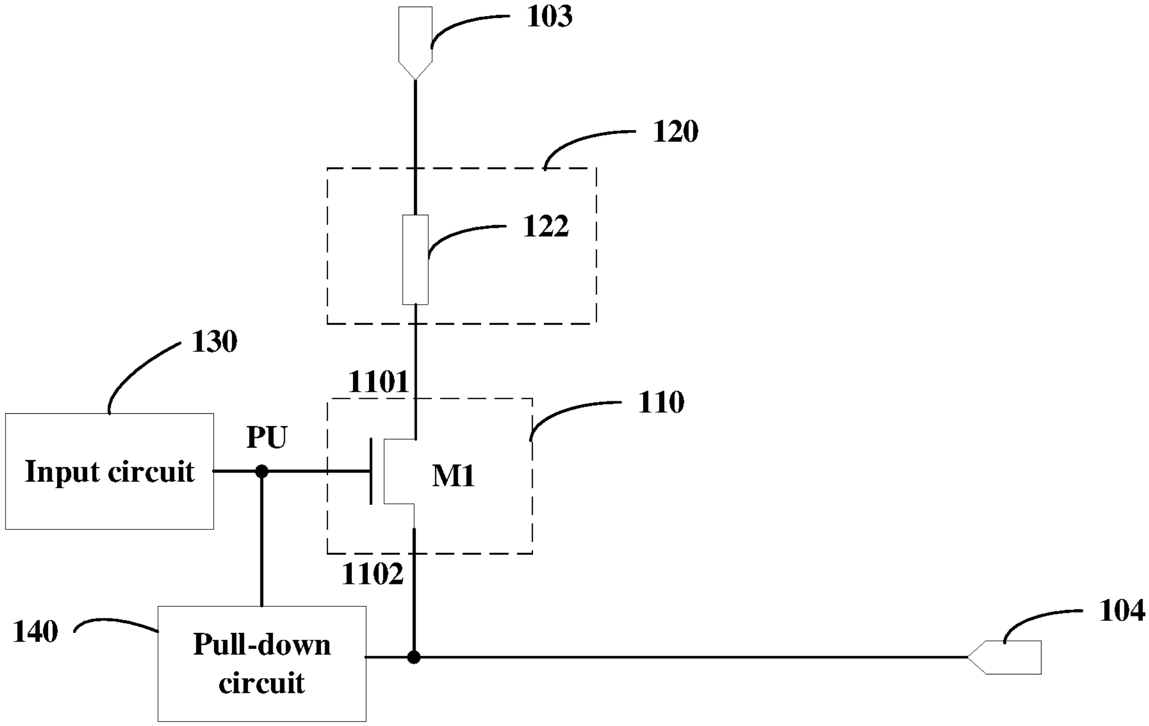
FIG. 2 is a schematic view showing a connection of a gate driving circuit according to another embodiment of the present disclosure.

FIG. 2 is a schematic view showing a connection of a gate driving circuit according to another embodiment of the present disclosure.

In some embodiments, the output circuit 110 comprises a switching transistor M1 (which may be referred to as a first switching transistor so as to distinguish it from other switching transistors described later). A gate of the switching transistor M1 is electrically connected to the pull-up node PU. A first electrode of the switching transistor M1 serves as the first terminal 1101 of the output circuit 110. That is, the first electrode of the switching transistor M1 is electrically connected to the signal input terminal 103. A second electrode of the switching transistor M1 serves as the second terminal 1102 of the output circuit 110. That is, the second electrode of the switching transistor M1 is electrically connected to the signal output terminal 104.

In some embodiments, as shown in FIG. 2, the current limiting circuit 120 comprises a first resistor 122. For example, the first resistor 122 may comprise a fixed resistor. In some embodiments, a resistance value of the first resistor 122 may range from 50Ω to 500Ω. The first resistor 122 may be disposed between the first electrode of the switching transistor M1 and the signal input terminal 103. That is, a first terminal of the first resistor 122 is electrically connected to the first electrode of the switching transistor M1, and a second terminal of the first resistor 122 is electrically connected to the signal input terminal 103. For example, the first resistor may be disposed on a PCB (Printed Circuit Board). In the embodiment, the first resistor is disposed between the switching transistor and the signal input terminal, which may not only achieve the current limiting effect, but also facilitate the manufacture of the circuit.

In some embodiments, a current magnitude of the gate driving signal may be measured, a resistance value of the first resistor is adjusted according to the current magnitude, and the first resistor having an appropriate resistance value is disposed in the above-described gate driving circuit. For example, when the current is greater than a threshold (e.g., 36 mA), the resistance value of the first resistor may be increased.

Figure 3:
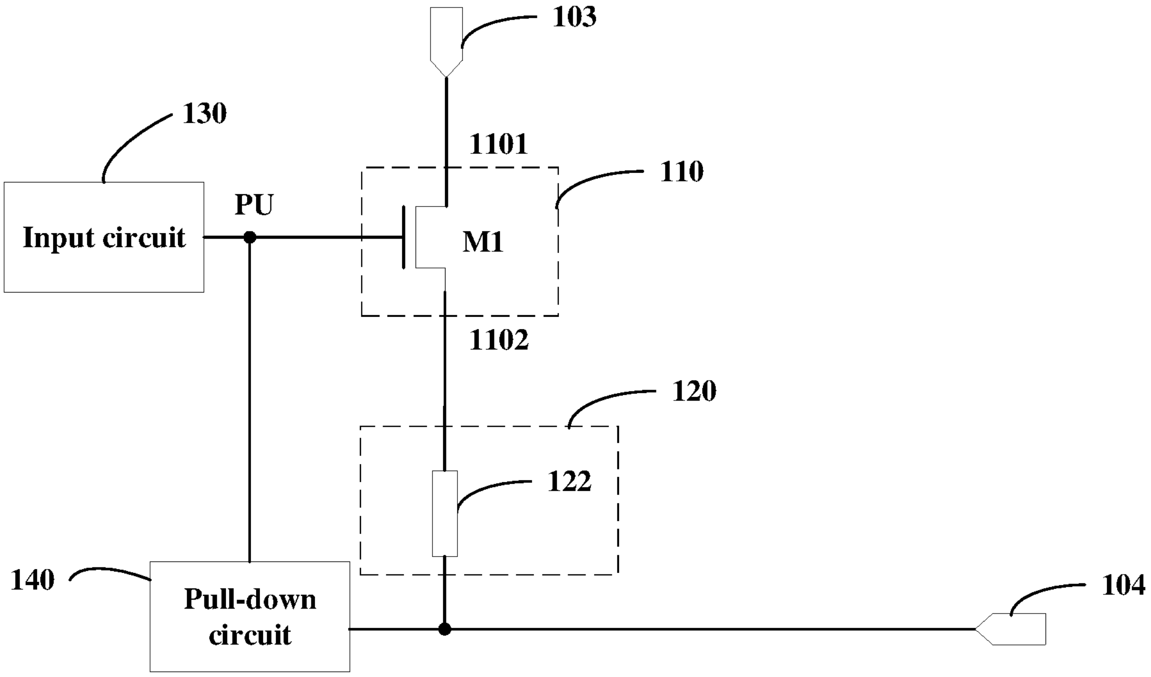
FIG. 3 is a schematic view showing a connection of a gate driving circuit according to another embodiment of the present disclosure.

FIG. 3 is a schematic view showing a connection of a gate driving circuit according to another embodiment of the present disclosure.

Similar to the above description, in the gate driving circuit shown in FIG. 3, the output circuit 110 comprises the switching transistor M1, and the current limiting circuit 120 comprises the first resistor 122.

As shown in FIG. 3, the first electrode (as the first terminal 1101 of the output circuit 110) of the switching transistor M1 is electrically connected to the signal input terminal 103. The second electrode (as the second terminal 1102 of the output circuit 110) of the switching transistor M1 is electrically connected to the signal output terminal 104. The gate of the switching transistor M1 is electrically connected to the pull-up node PU.

The current limiting circuit 120 is disposed between the second terminal 1102 of the output circuit 110 and the signal output terminal 104. That is, a first terminal of the first resistor 122 is electrically connected to the second electrode of the switching transistor M1, and a second terminal of the first resistor 122 is electrically connected to the signal output terminal 104. In the embodiment, the first resistor is disposed between the switching transistor and the signal output terminal, so that the current limiting effect may also be achieved.

Figure 4:
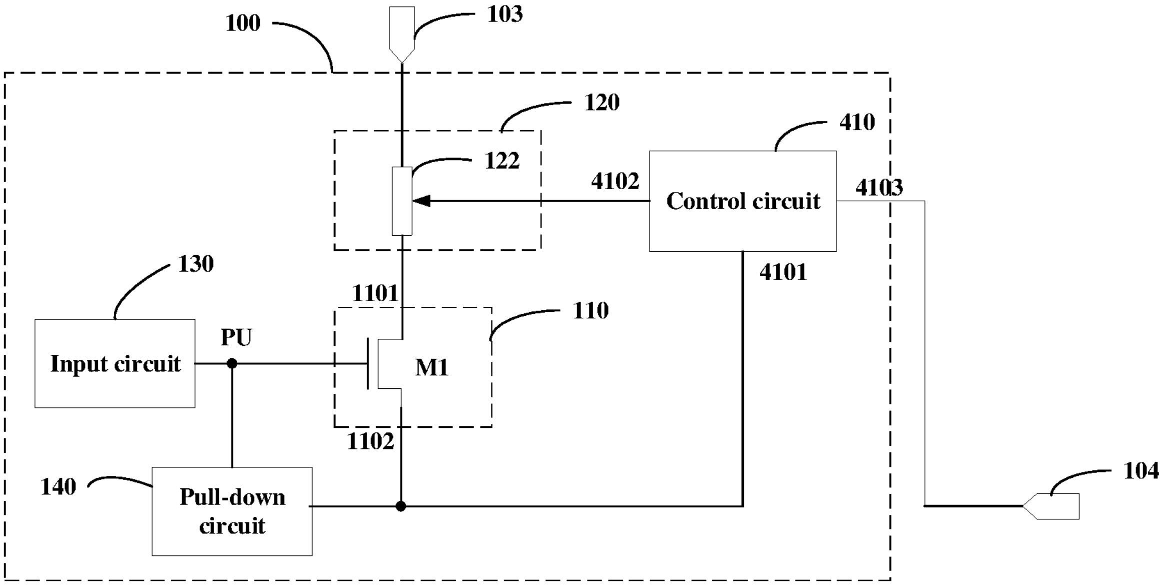
FIG. 4 is a schematic view showing a connection of a gate driving circuit according to another embodiment of the present disclosure.

FIG. 4 is a schematic view showing a connection of a gate driving circuit according to another embodiment of the present disclosure.

In some embodiments, the first resistor 122 comprises a sliding rheostat (e.g., a digital sliding rheostat). As shown in FIG. 4, each gate driving sub-circuit 100 may further comprise a control circuit 410 in addition to the output circuit 110 and the current limiting circuit 120. For example, the control circuit may be disposed on the PCB. For another example, the control circuit may be integrated in an integrated circuit. As shown in FIG. 4, a current input terminal 4101 of the control circuit 410 is electrically connected to the second terminal 1102 of the output circuit 110. For example, the current input terminal 4101 of the control circuit 410 is electrically connected to the second electrode of the switching transistor M1. A signal adjusting terminal 4102 of the control circuit 410 is electrically connected to a signal receiving terminal of the sliding rheostat. A current output terminal 4103 of the control circuit 410 is electrically connected to the signal output terminal 104.

The control circuit 410 is configured to output an adjusting signal to the sliding rheostat according to the current magnitude of the gate driving signal to adjust a resistance value of the sliding rheostat. For example, the control circuit may obtain the current magnitude of the gate driving signal, and obtain the adjusting signal according to the current magnitude. In the embodiment, the control circuit may adjust the resistance value of the sliding rheostat in real time according to the current magnitude of the gate driving signal, thereby achieving real-time adjustment of the current magnitude of the gate driving signal.

In some embodiments, the control circuit 410 is configured to output an adjusting signal for increasing the resistance value to the sliding rheostat in a case where the current magnitude of the gate driving signal is greater than a threshold. In this way, it is possible to produce a current limiting effect, thereby preventing abnormal display of the display panel that might be caused by an excessive current as much as possible.

In some embodiments, the threshold may range from 31 mA to 36 mA. Of course, those skilled in the art may understand that the threshold may be determined according to actual conditions, so that the range of the threshold is not limited thereto.

Figure 5:
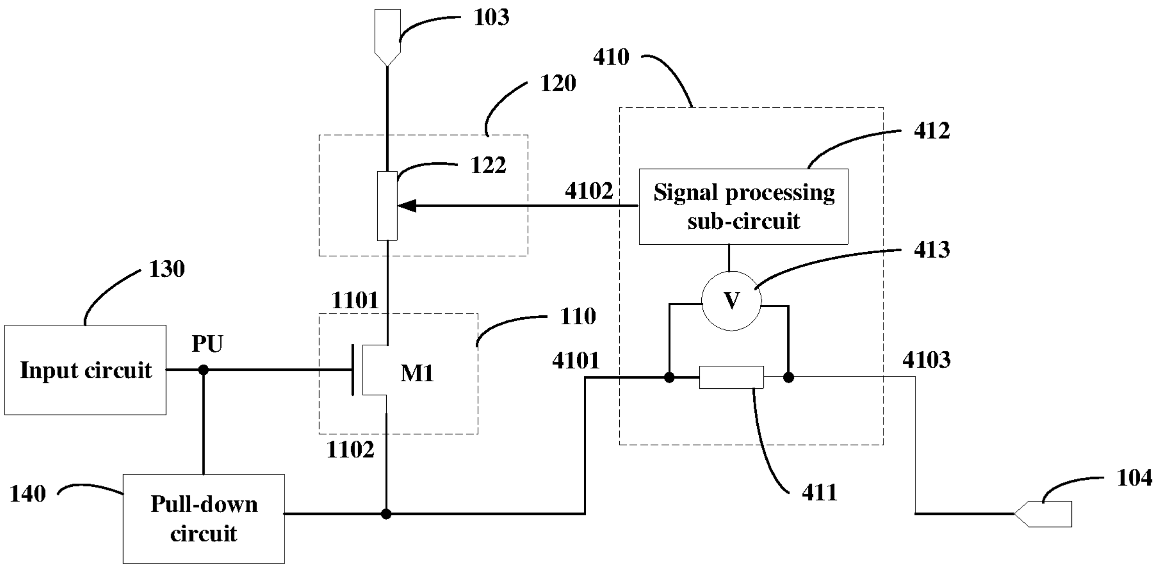
FIG. 5 is a schematic view showing a connection of a gate driving circuit according to another embodiment of the present disclosure.

FIG. 5 is a schematic view showing a connection of a gate driving circuit according to another embodiment of the present disclosure. Compared with FIG. 4, FIG. 5 shows a specific implementation of the control circuit.

As shown in FIG. 5, the control circuit 410 may comprise a second resistor 411, a voltage detector 413 and a signal processing sub-circuit 412. A first terminal (as the current input terminal 4101 of the control circuit) of the second resistor 411 is electrically connected to the second terminal 1102 of the output circuit 110. A second terminal (as the current output terminal 4103 of the control circuit) of the second resistor 411 is electrically connected to the signal output terminal 104. The voltage detector 413 is connected in parallel with the second resistor 411, and an output terminal of the voltage detector 413 is electrically connected to an input terminal of the signal processing sub-circuit 412. An output terminal (as the signal adjusting terminal 4102 of the control circuit) of the signal processing sub-circuit 412 is electrically connected to a signal receiving terminal of the sliding rheostat.

The voltage detector 413 is configured to obtain a voltage between the first terminal of the second resistor 411 and the second terminal of the second resistor 411, and transmit the voltage to the signal processing sub-circuit 412.

The signal processing sub-circuit 412 is configured to receive the voltage from the voltage detector, calculate the current magnitude of the gate driving signal according to the voltage and a resistance value of the second resistor 411, generate the adjusting signal according to the current magnitude of the gate driving signal, and transmit the adjusting signal to the sliding rheostat. For example, the signal processing sub-circuit may comprise a timing controller circuit. For example, the timing controller circuit may be a known timing controller.

In the embodiment, the current of the gate driving signal flows through the second resistor; the voltage detector obtains a voltage between two terminals of the second resistor and transmits the voltage to the signal processing sub-circuit; and the signal processing sub-circuit calculates the current magnitude of the gate driving signal according to the voltage and the resistance value of the second resistor, so that the resistance value of the sliding rheostat may be adjusted according to the current magnitude. In this way, it is possible to produce a current limiting effect, thereby preventing abnormal display of the display panel that might be caused by an excessive current as much as possible.

In some embodiments, the resistance value of the second resistor 411 is less than a resistance value of the first resistor 122. For example, the resistance value of the second resistor 411 may range from 5 mΩ to 500 mΩ. In this way, the second resistor does not affect the current magnitude of the gate driving signal as much as possible.

Of course, those skilled in the art may understand that the control circuit in the embodiments of the present disclosure is not limited to the above-described circuit structure. For example, the control circuit may comprise a current detecting sub-circuit and a signal processing sub-circuit. The current detecting module may be configured to obtain the current magnitude of the gate driving signal and transmit the current magnitude to the signal processing sub-circuit. The signal processing sub-circuit may be configured to generate an adjusting signal according to the current magnitude of the gate driving signal and transmit the adjusting signal to the sliding rheostat to adjust the resistance value of the sliding rheostat.

Figure 6:
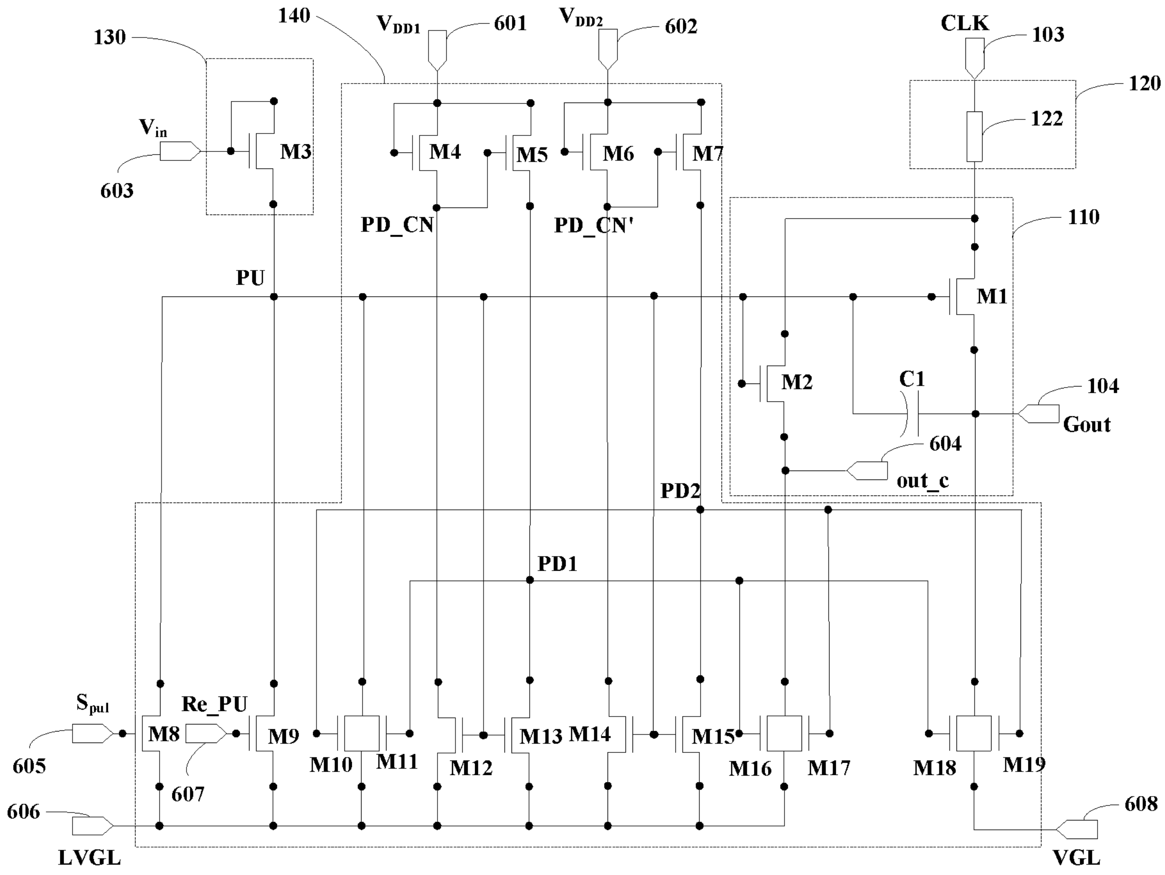
FIG. 6 is a schematic view showing a connection of a gate driving circuit according to another embodiment of the present disclosure.

FIG. 6 is a schematic view showing a connection of a gate driving circuit according to another embodiment of the present disclosure. FIG. 6 shows a specific implementation of the gate driving sub-circuit of the gate driving circuit. For example, FIG. 6 shows specific implementations of the output circuit 110, the current limiting circuit 120, the input circuit 130, and the pull-down circuit 140.

In some embodiments, as shown in FIG. 6, the output circuit 110 may comprise a first switching transistor M1, a second switching transistor M2, and a capacitor C1. A gate of the first switching transistor M1 is electrically connected to the pull-up node PU, a first electrode of the first switching transistor M1 is electrically connected to the first signal input terminal 103 through the first resistor 122 (as the current limiting circuit 120), and a second electrode of the first switching transistor M1 is electrically connected to the first signal output terminal 104. A gate of the second switching transistor M2 is electrically connected to the pull-up node PU, a first electrode of the second switching transistor M2 is electrically connected to the first electrode of the first switching transistor M1, and a second electrode of the second switching transistor M2 is electrically connected to a second signal output terminal 604. A first terminal of the capacitor C1 is electrically connected to the gate of the first switching transistor M1, and a second terminal of the capacitor C1 is electrically connected to the second electrode of the first switching transistor M1. The first signal input terminal 103 is configured to input a level signal (e.g., a clock signal CLK) to the output circuit 110. The first signal output terminal 104 is configured to output a gate driving signal Gout to other circuits. The second signal output terminal 604 is configured to output a next stage signal out_c. The next stage signal out_c serves as an input signal $V_{in}$ of the gate driving sub-circuit of a next cascade (or a next row).

In some embodiments, as shown in FIG. 6, the input circuit 130 comprises a third switching transistor M3. A gate of the third switching transistor M3 is electrically connected to a second signal input terminal 603. A first electrode of the third switching transistor M3 is electrically connected to the gate thereof. A second electrode of the third switching transistor M3 is electrically connected to the pull-up node PU. The second signal input terminal 603 is configured to input the input signal $V_{in}$ to the input circuit 130.

In some embodiments, as shown in FIG. 6, the pull-down circuit 140 comprises a fourth switching transistor M4, a fifth switching transistor M5, a sixth switching transistor M6, a seventh switching transistor M7, an eighth switching transistor M8, a ninth switching transistor M9, a tenth switching transistor M10, an eleventh switching transistor M11, a twelfth switching transistor M12, a thirteenth switching transistor M13, a fourteenth switching transistor M14, a fifteenth switching transistor M15, a sixteenth switching transistor M16, a seventeenth switching transistor M17, an eighteenth switching transistor M18 and a nineteenth switching transistor M19.

As shown in FIG. 6, a gate of the fourth switching transistor M4 is electrically connected to a first electrode thereof, and is commonly electrically connected to a first voltage input terminal 601. A second electrode of the fourth switching transistor M4 is electrically connected to a first node PD_CN. A first electrode of the fifth switching transistor M5 is electrically connected to the first voltage input terminal 601. A second electrode of the fifth switching transistor M5 is electrically connected to a third node PD1. A gate of the fifth switching transistor M5 is electrically connected to the first node PD_CN. The first voltage input terminal 601 is configured to input a first voltage $V_{DD1}$ to the pull-down circuit 140.

As shown in FIG. 6, agate of the sixth switching transistor M6 is electrically connected to a first electrode thereof, and is commonly electrically connected to a second voltage input terminal 602. A second electrode of the sixth switching transistor M6 is electrically connected to a second node PD_CN'. A first electrode of the seventh switching transistor M7 is electrically connected to the second voltage input terminal 602. A second electrode of the seventh switching transistor M7 is electrically connected to a fourth node PD2. A gate of the seventh switching transistor M7 is electrically connected to the second node PD_CN'. The second voltage input terminal 602 is configured to input a second voltage $V_{DD2}$ to the pull-down circuit 140.

It should be noted that the timing of the first voltage $V_{DD1}$ is opposite to the timing of the second voltage $V_{DD2}$. That is, the second voltage $V_{DD2}$ is a low level in the case where the first voltage $V_{DD1}$ is a high level; and the second voltage $V_{DD2}$ is a high level in the case where the first voltage $V_{DD1}$ is a low level. In this way, potentials of the first node PD_CN and the third node PD1 may be changed in the case where the first voltage $V_{DD1}$ is the high level, and potentials of the second node PD_CN' and the fourth node PD2 may be changed in the case where the second voltage $V_{DD2}$ is the high level.

As shown in FIG. 6, a gate of the eighth switching transistor M8 is electrically connected to a third signal input terminal 605, a first electrode of the eighth switching transistor M8 is electrically connected to the pull-up node PU, and a second electrode of the eighth switching transistor M8 is electrically connected to a fourth signal input terminal 606. The third signal input terminal 605 is configured to input a pulse signal $S_{pu1}$ to the pull-down circuit 140. The fourth signal input terminal 606 is configured to input a third voltage LVGL to the pull-down circuit 140. For example, the third voltage LVGL may be a low level.

As shown in FIG. 6, agate of the ninth switching transistor M9 is electrically connected to a fifth signal input terminal 607, a first electrode of the ninth switching transistor is electrically connected to the pull-up node PU, and a second electrode of the ninth switching transistor M9 is electrically connected to the fourth signal input terminal 606. The fifth signal input terminal 607 is configured to input a reset signal Re_PU to the pull-down circuit 140.

As shown in FIG. 6, agate of the tenth switching transistor M10 is electrically connected to the fourth node PD2, a first electrode of the tenth switching transistor M10 is electrically connected to the pull-up node PU, and a second electrode of the tenth switching transistor M10 is electrically connected to the fourth signal input terminal 606. Agate of the eleventh switching transistor M11 is electrically connected to the third node PD1, a first electrode of the eleventh switching transistor M11 is electrically connected to the pull-up node PU, and a second electrode of the eleventh switching transistor M11 is electrically connected to the fourth signal input terminal 606.

As shown in FIG. 6, a gate of the twelfth switching transistor M12 is electrically connected to the pull-up node PU, a first electrode of the twelfth switching transistor M12 is electrically connected to the first node PD_CN, and a second electrode of the twelfth switching transistor M12 is electrically connected to the fourth signal input terminal 606. A gate of the thirteenth switching transistor M13 is electrically connected to the pull-up node PU, a first electrode of the thirteenth switching transistor M13 is electrically connected to the third node PD1, and a second electrode of the thirteenth switching transistor M13 is electrically connected to the fourth signal input terminal 606.

As shown in FIG. 6, a gate of the fourteenth switching transistor M14 is electrically connected to the pull-up node PU, a first electrode of the fourteenth switching transistor M14 is electrically connected to the second node PD_CN', and a second electrode of the fourteenth switching transistor M14 is electrically connected to the fourth signal input terminal 606. A gate of the fifteenth switching transistor M15 is electrically connected to the pull-up node PU, a first electrode of the fifteenth switching transistor M15 is electrically connected to the fourth node PD2, and a second electrode of the fifteenth switching transistor M15 is electrically connected to the fourth signal input terminal 606.

As shown in FIG. 6, a gate of the sixteenth switching transistor M16 is electrically connected to the third node PD1, a first electrode of the sixteenth switching transistor M16 is electrically connected to the second electrode of the second switching transistor M2, and a second electrode of the sixteenth switching transistor M16 is electrically connected to the fourth signal input terminal 606. A gate of the seventeenth switching transistor M17 is electrically connected to the fourth node PD2, a first electrode of the seventeenth switching transistor M17 is electrically connected to the second electrode of the second switching transistor M2, and a second electrode of the seventeenth switching transistor M17 is electrically connected to the fourth signal input terminal 606.

As shown in FIG. 6, a gate of the eighteenth switching transistor M18 is electrically connected to the third node PD1, a first electrode of the eighteenth switching transistor M18 is electrically connected to the second electrode of the first switching transistor M1, and a second electrode of the eighteenth switching transistor M18 is electrically connected to a sixth signal input terminal 608. A gate of the nineteenth switching transistor M19 is electrically connected to the fourth node PD2, a first electrode of the nineteenth switching transistor M19 is electrically connected to the second electrode of the first switching transistor M1, and a second electrode of the nineteenth switching transistor M19 is electrically connected to the sixth signal input terminal 608. The sixth signal input terminal is configured to input a fourth voltage VGL to the pull-down circuit 140. For example, the fourth voltage VGL may be a low level.

It should be noted that the switching transistors in the embodiments of the present disclosure are exemplified by NMOS (Negative channel Metal Oxide Semiconductor) transistors. In other embodiments, the switching transistors in the embodiments of the present disclosure may also be PMOS (Positive channel Metal Oxide Semiconductor) transistors.

It should also be noted that FIG. 6 shows specific circuit structures of the input circuit, the output circuit, and the pull-down unit according to some embodiments. However, those skilled in the art can understand that the input circuit, the output circuit, and the pull-down circuit in the embodiments of the present disclosure may also have the circuit structures in other embodiments respectively. Therefore, the scope of the embodiments of the present disclosure is not limited thereto.

Figure 7:
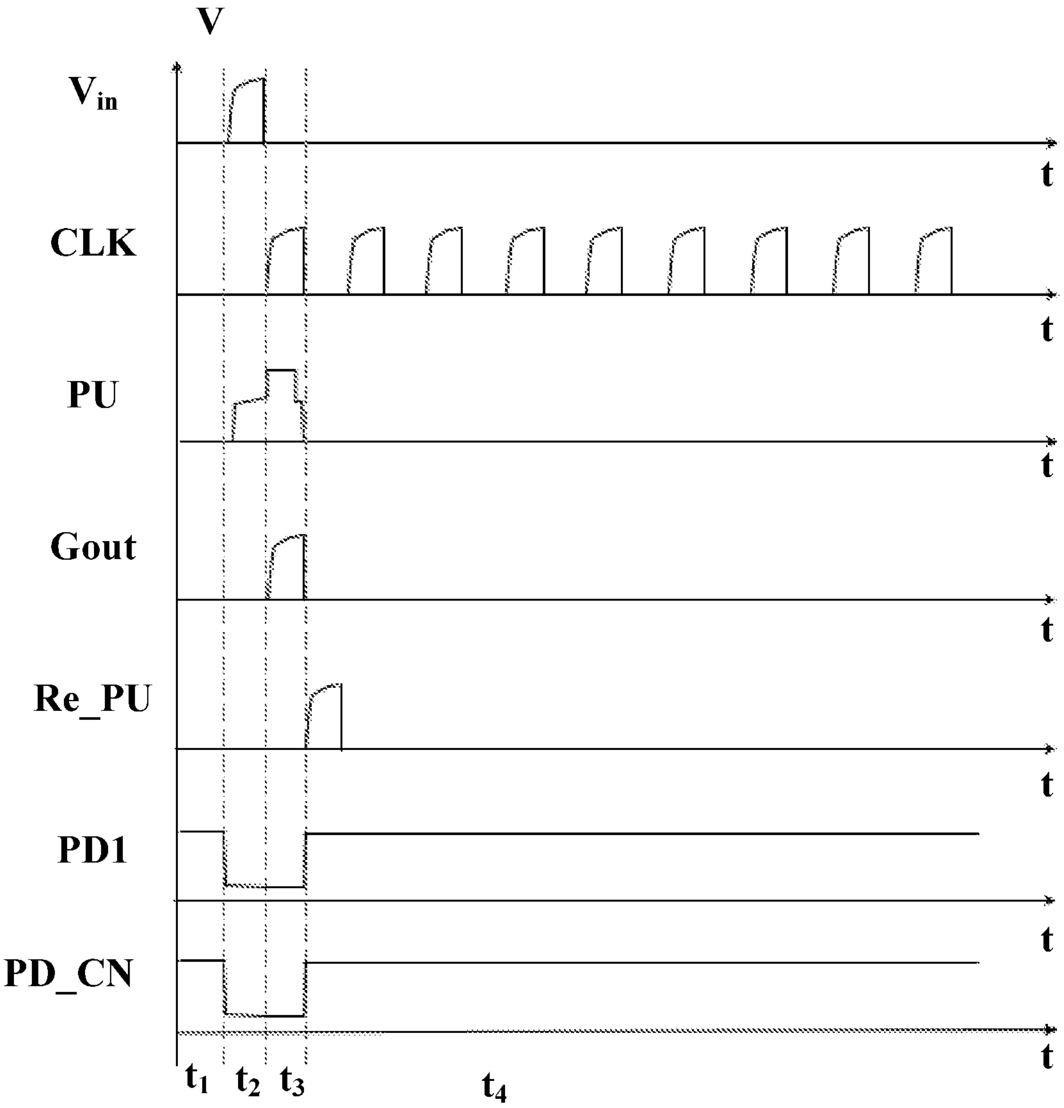
FIG. 7 is a timing control view showing signals for a gate driving circuit according to an embodiment of the present disclosure.

FIG. 7 is a timing control view showing signals for agate driving circuit according to an embodiment of the present disclosure. FIG. 7 shows a timing condition of some of the signals described above. The operation process of the gate driving circuit according to some embodiments of the present disclosure will be described in detail below in conjunction with FIGS. 6 and 7. Here, the operation process will be described by taking the first voltage $V_{DD1}$ as a high level and the second voltage $V_{DD2}$ as a low level as an example.

First, at a first stage $t_1$, the input signal $V_{in}$ of the second signal input terminal 603 is a low level, and the potential of the pull-up node PU is a low level. This causes the first switching transistor M1 to be turned off. The first signal output terminal 104 does not output the gate driving signal Gout, and the second signal output terminal 604 does not output the next stage signal out_c as well.

Next, at a second stage $t_2$, the input signal $V_{in}$ of the second signal input terminal 603 becomes a high level. In this case, the second switching transistor M2 is turned on, and the capacitor C1 is charged, such that the potential of the pull-up node PU is pulled up to a high level. This causes the twelfth switching transistor M12 and the thirteenth switching transistor M13 to be turned on. Generally, since the third voltage LVGL is a low level, the potentials of the first node PD_CN and the third node PD1 are pulled down. In addition, since the potential of the pull-up node PU is pulled up, the first switching transistor M1 is turned on. However, since the level signal (e.g., the clock signal) CLK is a low level, the first signal output terminal 104 outputs a low level signal. In the embodiments of the present disclosure, a high level signal output from the first signal output terminal 104 may be regarded as the gate driving signal. Therefore, it may be regarded that the gate driving signal is not output in the case where the first signal output terminal 104 outputs the low level signal.

Next, at a third stage t3, the input signal $V_{in}$ changes from the high level to a low level, which causes the second switching transistor M2 to be turned off. The level signal (e.g., the clock signal) CLK is a high level. Due to a bootstrap effect of the capacitor C1, a potential of the pull-up node PU is continuously pulled up to a higher level. Since the first switching transistor M1 is turned on, the first signal output terminal 104 outputs the gate driving signal Gout having a high level. Since the gate driving circuit is electrically connected to other circuits (e.g., pixel circuits) of the display panel, a current of the gate driving signal may flow into the other circuits. Since the current limiting circuit 120 is provided in the gate driving sub-circuit, the current magnitude of the output gate driving signal may be limited, thereby preventing abnormal display of the display panel which might be caused by an excessive current as much as possible.

In addition, since the twelfth switching transistor M12 and the thirteenth switching transistor M13 are turned on, and the third voltage LVGL is a low level, the potentials of the first node PD_CN and the third node PD1 are still low levels.

Next, at a fourth stage t4, the reset signal Re_PU changes from a low level to a high level, which causes the ninth switching transistor M9 to be turned on. Since the third voltage LVGL is a low level, the potential of the pull-up node PU is pulled down to a low level. The first switching transistor M1 is turned off, and the first signal output terminal 104 stops outputting the gate driving signal Gout.

In some embodiments, at the fourth stage t4, since the first voltage $V_{DD1}$ (not shown in FIG. 7) of the first voltage input terminal 601 is a high level, the fourth switching transistor M4 is turned on, and the potential of the first node PD_CN changes from the low level to a high level. In this way, the fifth switching transistor M5 is also turned on, and the potential of the third node PD1 also changes from the low level to a high level. This causes the eleventh switching transistor M11 to be turned on. Since the third voltage LVGL is a low level, the potential of the pull-up node PU may be pulled down to a low level more adequately.

In other embodiments, at the fourth stage t4, the third signal input terminal 605 outputs the pulse signal $S_{pu1}$ (not shown in FIG. 7) having a high level to the eighth switching transistor M8, so that the eighth switching transistor M8 is turned on. Since the third voltage LVGL is a low level, the potential of the pull-up node PU may be pulled down to a low level more adequately.

So far, the operation process of the gate driving circuit according to some embodiments of the present disclosure is provided. In the operation process, since a current limiting circuit is provided in the gate driving circuit, the current magnitude of the output gate driving signal may be limited, thereby preventing abnormal display of the display panel that might be caused by an excessive current as much as possible.

Figure 8:
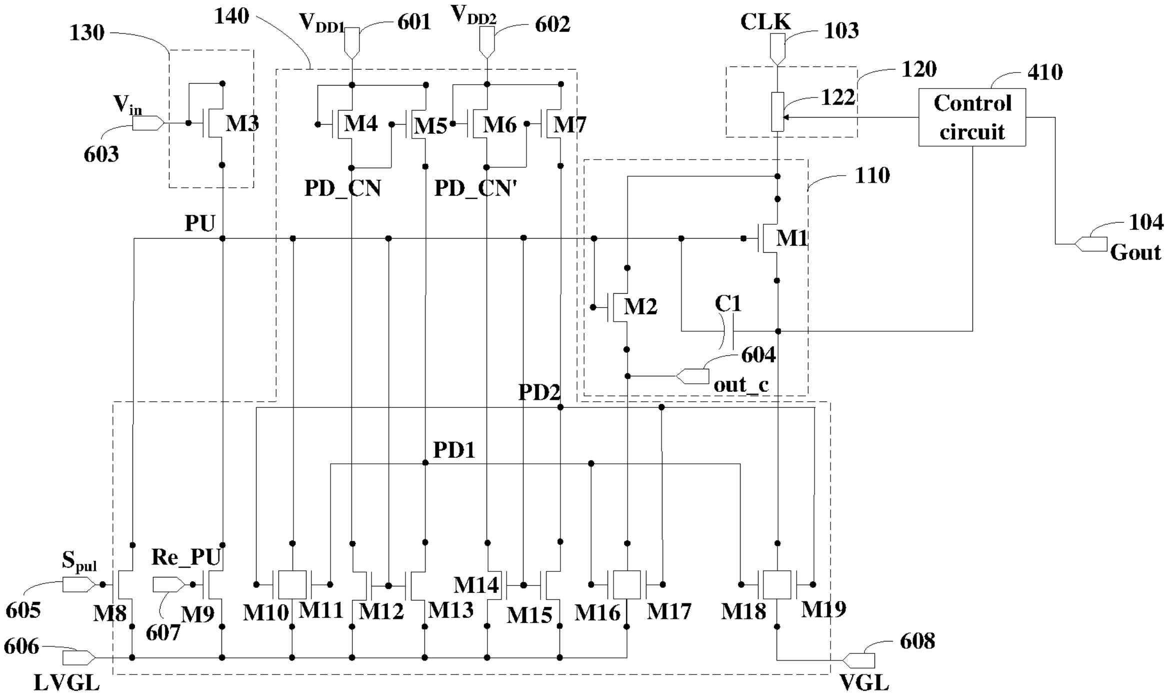
FIG. 8 is a schematic view showing a connection of a gate driving circuit according to another embodiment of the present disclosure.

FIG. 8 is a schematic view showing a connection of a gate driving circuit according to another embodiment of the present disclosure.

Similar to FIG. 6, FIG. 8 shows specific implementations of the output circuit 110, the current limiting circuit 120, the input circuit 130, and the pull-down circuit 140. The gate driving sub-circuit of the gate driving circuit shown in FIG. 8 further comprises a control circuit 410. The control circuit 410 has been described in detail above and thus will not be described in detail here. In the embodiment, the control circuit may adjust the resistance value of the sliding rheostat as the limiting circuit in real time according to a measured current magnitude of the gate driving signal, so that the current magnitude of the gate driving signal may be adjusted so as to produce a current limiting effect.

Figure 9:
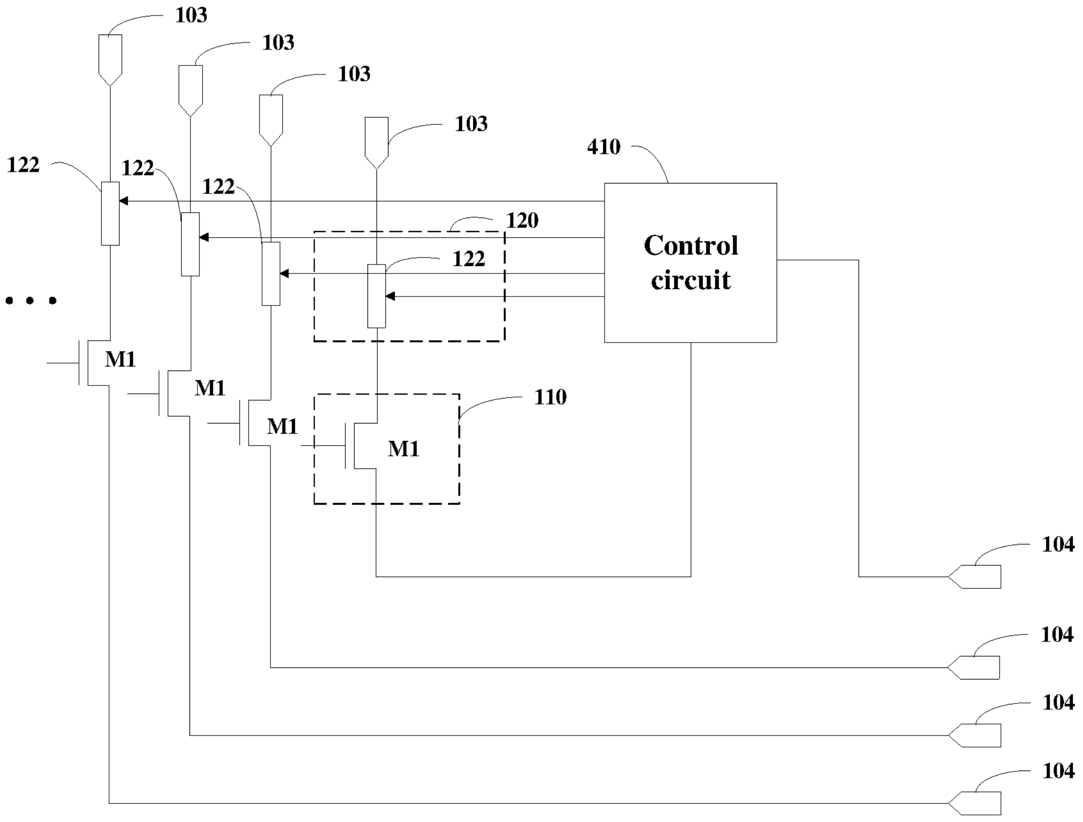
FIG. 9 is a schematic view showing a connection of a gate driving circuit according to another embodiment of the present disclosure.

FIG. 9 is a schematic view showing a connection of a gate driving circuit according to another embodiment of the present disclosure. It should be noted that, for convenience of illustration, only a partial circuit structure of the gate driving sub-circuit in the gate driving circuit is shown in FIG. 9.

In some embodiments, at least one gate driving sub-circuit may comprise a plurality of gate driving sub-circuits. Since each gate driving sub-circuit may comprise one current limiting circuit 120, a plurality of gate driving sub-circuits may comprise a plurality of current limiting circuits 120. In addition, since each gate driving sub-circuit may comprise one output circuit 110, the plurality of gate driving sub-circuits may comprise a plurality of output circuits 110. As shown in FIG. 9, the plurality of output circuits 110 are electrically connected to a plurality of signal output terminals 104 in one-to-one correspondence.

As shown in FIG. 9, the second terminal of the output circuit 110 of one gate driving sub-circuit in the plurality of gate driving sub-circuits is electrically connected to a current input terminal of the control circuit 410. For example, the second terminal of the output circuit 110 of the gate driving sub-circuit located in a first row is electrically connected to the current input terminal of the control circuit 410.

As shown in FIG. 9, a current output terminal of the control circuit 410 is electrically connected to a signal output terminal 104 corresponding to the output circuit of the one gate driving sub-circuit. For example, the current output terminal of the control circuit 410 is electrically connected to the signal output terminal 104 corresponding to the output circuit 110 of the gate driving sub-circuit located in the first row. Here, the output circuit of the gate driving sub-circuit located in the first row is selected to be electrically connected to the control circuit, so that the wiring space within the display panel may be optimized.

As shown in FIG. 9, the control circuit 410 may comprise a plurality of signal adjusting terminals. The plurality of signal adjusting terminals are electrically connected to a plurality of current limiting circuits 120 of the plurality of gate driving sub-circuits in one-to-one correspondence. For example, the plurality of signal adjusting terminals are electrically connected to signal receiving terminals of the plurality of sliding rheostats 122 (as the plurality of current limiting circuits) in one-to-one correspondence. The inventors of the embodiment of the present disclosure have found that in the plurality of gate driving sub-circuits, since the current magnitudes of the gate driving signals output by different gate driving sub-circuits are substantially equal, the current magnitudes of the gate driving signals of the plurality of gate driving sub-circuits may be detected by one control circuit, thereby controlling the resistance values of a plurality of sliding rheostats (as current limiting circuits). It should be noted that, after the resistance values of the plurality of sliding rheostats are adjusted, the resistance values of the plurality of sliding rheostats may be equal or different.

In the embodiment, in a plurality of gate driving sub-circuits of the gate driving circuit, a control circuit may be provided to adjust the resistance values of the current limiting circuits in the plurality of gate driving sub-circuits, so as to implement adjusting the current magnitudes of different gate driving signals. In this way, it is possible to reduce the number of control circuits and simplify the circuit, thereby also facilitating the production and manufacture of the gate driving circuit.

In the embodiments of the present disclosure, a display device is also provided. The display device comprises the gate driving circuit as described above, for example, the gate driving circuit shown in FIG. 1, FIG. 2, FIG. 3, FIG. 4, FIG. 5, FIG. 6, FIG. 8, or FIG. 9. For example, the display device may be any product or member with a display function such as a display panel, a display screen, a display, a mobile phone, a tablet computer, a notebook computer, a television, a navigator, or the like.

Figure 10:
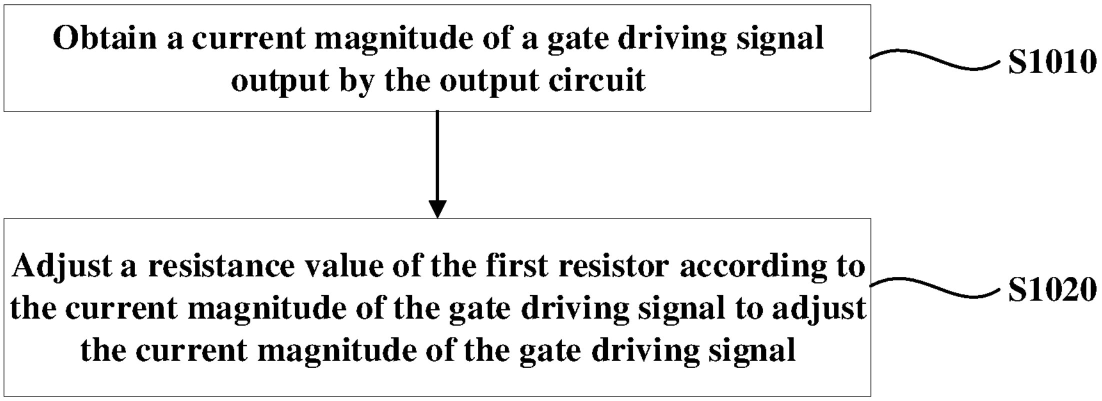
FIG. 10 is a flowchart showing a current adjusting method for a gate driving circuit according to an embodiment of the present disclosure.

FIG. 10 is a flowchart showing a current adjusting method for a gate driving circuit according to an embodiment of the present disclosure. The gate driving circuit comprises at least one gate driving sub-circuit. Each gate driving sub-circuit comprises an output circuit and a current limiting circuit. The output circuit is electrically connected to the current limiting circuit. The current limiting circuit comprises a first resistor. As shown in FIG. 10, the current adjusting method may comprise steps S1010 to S1020.

At step S1010, a current magnitude of a gate driving signal output by the output circuit is obtained.

At step S1020, a resistance value of the first resistor is adjusted according to the current magnitude of the gate driving signal to adjust the current magnitude of the gate driving signal.

In the embodiment, the resistance value of the first resistor is adjusted according to the current magnitude of the gate driving signal, thereby adjusting the current of the gate driving signal. In this way, the current limiting effect may be achieved on the gate driving signal, thereby preventing abnormal display of the display panel which might be caused by an excessive current as much as possible.

In some embodiments, the step S1020 may comprise: increasing the resistance value of the first resistor in a case where the current magnitude of the gate driving signal is greater than a threshold. In this way, the current of the gate drive signal may not exceed the threshold, so as to limit the current.

In some embodiments, the first resistor comprises a sliding rheostat (e.g., a digital sliding rheostat). The step S1020 may comprise: generating an adjusting signal according to the current magnitude of the gate driving signal; and transmitting the adjusting signal to the sliding rheostat to adjust a resistance value of the sliding rheostat. In the embodiment, the resistance value of the sliding rheostat is automatically adjusted, thereby implementing adjusting the current magnitude of the gate driving signal.

Hereto, various embodiments of the present disclosure have been described in detail. Some details well known in the art are not described to avoid obscuring the concept of the present disclosure. According to the above-described description, those skilled in the art would fully know how to implement the technical solutions disclosed herein.

Although some specific embodiments of the present disclosure have been described in detail by way of examples, those skilled in the art should understand that the above-described examples are only for the purpose of illustration and are not intended to limit the scope of the present disclosure. It should be understood by those skilled in the art that modifications to the above-described embodiments or equivalently substitution of part of the technical features may be made without departing from the scope and spirit of the present disclosure. The scope of the present disclosure is defined by the appended claims.

What is claimed is:

1. A gate driving circuit, comprising: at least one gate driving sub-circuit, each of which comprises:

an output circuit configured to output a gate driving signal; and a current limiting circuit electrically connected to the output circuit, and configured to limit a current magnitude of the gate driving signal;

wherein a first terminal of the output circuit is electrically connected to a first signal input terminal, and a second terminal of the output circuit is electrically connected to a first signal output terminal; and the current limiting circuit is disposed between the first terminal of the output circuit and the first signal input terminal, or disposed between the second terminal of the output circuit and the first signal output terminal;

the current limiting circuit comprises a first resistor, the first resistor comprises a sliding rheostat;

each of the at least one gate driving sub-circuit further comprises a control circuit configured to output an adjusting signal to the sliding rheostat according to the current magnitude of the gate driving signal to adjust a resistance value of the sliding rheostat;

wherein the control circuit comprises:

a second resistor, a first terminal of the second resistor being electrically connected to the second terminal of the output circuit, and a second terminal of the second resistor being electrically connected to the first signal output terminal;

a voltage detector connected in parallel with the second resistor and configured to obtain a voltage between the first terminal of the second resistor and the second terminal of the second resistor; and a signal processing sub-circuit, an input terminal of the signal processing sub-circuit being electrically connected to an output terminal of the voltage detector, an output terminal of the signal processing sub-circuit being electrically connected to a signal receiving terminal of the sliding rheostat, and the signal processing sub-circuit being configured to receive the voltage from the voltage detector, calculate the current magnitude of the gate driving signal according to the voltage and a resistance value of the second resistor, generate the adjusting signal according to the current magnitude of the gate driving signal, and transmit the adjusting signal to the sliding rheostat.

2. The gate driving circuit according to claim 1, wherein the control circuit is configured to output an adjusting signal for increasing the resistance value to the sliding rheostat in a case where the current magnitude of the gate driving signal is greater than a threshold.

3. The gate driving circuit according to claim 1, wherein a current input terminal of the control circuit is electrically connected to the second terminal of the output circuit, a signal adjusting terminal of the control circuit is electrically connected to a signal receiving terminal of the sliding rheostat, and a current output terminal of the control circuit is electrically connected to the first signal output terminal.

4. The gate driving circuit according to claim 1, wherein the resistance value of the second resistor is less than a resistance value of the first resistor.

5. The gate driving circuit according to claim 2, wherein the threshold ranges from 31 milliamperes (mA) to 36 mA.

6. The gate driving circuit according to claim 1, wherein:

the at least one gate driving sub-circuit comprises a plurality of gate driving sub-circuits;

the second terminal of the output circuit of one gate driving sub-circuit in the plurality of gate driving sub-circuits is electrically connected to a current input terminal of the control circuit;

a current output terminal of the control circuit is electrically connected to a first signal output terminal corresponding to the output circuit of the one gate driving sub-circuit; and the control circuit comprises a plurality of signal adjusting terminals electrically connected to a plurality of current limiting circuits of the plurality of gate driving sub-circuits in one-to-one correspondence.

7. The gate driving circuit according to claim 1, wherein the output circuit comprises a first switching transistor, a gate of the first switching transistor being electrically connected to a pull-up node, a first electrode of the first switching transistor serving as the first terminal of the output circuit, and a second electrode of the first switching transistor serving as the second terminal of the output circuit.

8. The gate driving circuit according to claim 7, wherein:

each of the at least one gate driving sub-circuit further comprises an input circuit configured to pull up a potential of a pull-up node under a control of an input signal;

the output circuit is configured to continue to pull up the potential of the pulled-up node under a control of a level signal, and output the gate driving signal; and each of the at least one gate driving sub-circuit further comprises a pull-down circuit configured to pull down the potential of the pull-up node that is pulled up, to make the output circuit stop outputting the gate driving signal.

9. A display device, comprising: the gate driving circuit according to claim 1.

10. The gate driving circuit according to claim 8, wherein the output circuit further comprises:

a second switching transistor, a gate of which is electrically connected to the pull-up node, a first electrode of which is electrically connected to the first electrode of the first switching transistor, and a second electrode of which is electrically connected to a second signal output terminal; and a capacitor, a first terminal of which is electrically connected to the gate of the first switching transistor, and a second terminal of which is electrically connected to the second electrode of the first switching transistor.

11. The gate driving circuit according to claim 10, wherein the input circuit comprises:

a third switching transistor, a gate of which is electrically connected to a second signal input terminal, a first electrode of which is electrically connected to the gate of the third switching transistor, and a second electrode of which is electrically connected to the pull-up node.

12. The gate driving circuit according to claim 11, wherein the pull-down circuit comprises:

a fourth switching transistor, a gate and a first electrode of which are electrically connected to a first voltage input terminal, and a second electrode of which is electrically connected to a first node;

a fifth switching transistor, a first electrode of which is electrically connected to the first voltage input terminal, a second electrode of which is electrically connected to a third node, and a gate of which is electrically connected to the first node;

a sixth switching transistor, a gate and a first electrode of which are electrically connected to a second voltage input terminal, and a second electrode of which is electrically connected to a second node;

a seventh switching transistor, a first electrode of which is electrically connected to the second voltage input terminal, a second electrode of which is electrically connected to a fourth node, and a gate of which is electrically connected to the second node;

an eighth switching transistor, a gate of which is electrically connected to a third signal input terminal, a first electrode of which is electrically connected to the pull-up node, and a second electrode of which is electrically connected to a fourth signal input terminal;

a ninth switching transistor, a gate of which is electrically connected to a fifth signal input terminal, a first electrode of which is electrically connected to the pull-up node, and a second electrode of which is electrically connected to the fourth signal input terminal;

a tenth switching transistor, a gate of which is electrically connected to the fourth node, a first electrode of which is electrically connected to the pull-up node, and a second electrode of which is electrically connected to the fourth signal input terminal;

an eleventh switching transistor, a gate of which is electrically connected to the third node, a first electrode of which is electrically connected to the pull-up node, and a second electrode of which is electrically connected to the fourth signal input terminal;

a twelfth switching transistor, a gate of which is electrically connected to the pull-up node, a first electrode of which is electrically connected to the first node, and a second electrode of which is electrically connected to the fourth signal input terminal;

a thirteenth switching transistor, a gate of which is electrically connected to the pull-up node, a first electrode of which is electrically connected to the third node, and a second electrode of which is electrically connected to the fourth signal input terminal;

a fourteenth switching transistor, a gate of which is electrically connected to the pull-up node, a first electrode of which is electrically connected to the second node, and a second electrode of which is electrically connected to the fourth signal input terminal;

a fifteenth switching transistor, a gate of which is electrically connected to the pull-up node, a first electrode of which is electrically connected to the fourth node, and a second electrode of which is electrically connected to the fourth signal input terminal;

a sixteenth switching transistor, a gate of which is electrically connected to the third node, a first electrode of which is electrically connected to the second electrode of the second switching transistor, and a second electrode of which is electrically connected to the fourth signal input terminal;

a seventeenth switching transistor, a gate of which is electrically connected to the fourth node, a first electrode of which is electrically connected to the second electrode of the second switching transistor, and a second electrode of which is electrically connected to the fourth signal input terminal;

an eighteenth switching transistor, a gate of which is electrically connected to the third node, a first electrode of which is electrically connected to the second electrode of the first switching transistor, and a second electrode of which is electrically connected to a sixth signal input terminal;

a nineteenth switching transistor, a gate of which is electrically connected to the fourth node, a first electrode of which is electrically connected to the second electrode of the first switching transistor, and a second electrode of which is electrically connected to the sixth signal input terminal.

13. The gate driving circuit according to claim 1, wherein the sliding rheostat comprise a digital sliding rheostat.

* * * * *